(12) United States Patent
Hayes et al.

(10) Patent No.: US 7,379,778 B2
(45) Date of Patent: May 27, 2008

(54) SYSTEM AND METHODS FOR HOME APPLIANCE IDENTIFICATION AND CONTROL IN A NETWORKED ENVIRONMENT

(75) Inventors: Patrick H. Hayes, Mission Viejo, CA (US); Jeremy Black, Santa Ana, CA (US)

(73) Assignee: Universal Electronics, Inc., Cypress, CA (US)

( * ) Notice: Subject to any disclaimer, the term of this patent is extended or adjusted under 35 U.S.C. 154(b) by 0 days.

(21) Appl. No.: 11/491,758

(22) Filed: Jul. 24, 2006

(65) Prior Publication Data
US 2006/0259184 A1   Nov. 16, 2006

Related U.S. Application Data

(60) Division of application No. 11/047,441, filed on Jan. 31, 2005, now Pat. No. 7,155,305, which is a continuation-in-part of application No. 10/978,860, filed on Nov. 1, 2004, now Pat. No. 7,136,709.

(60) Provisional application No. 60/517,283, filed on Nov. 4, 2003.

(51) Int. Cl.
*G06F 19/00* (2006.01)
*G06F 7/00* (2006.01)

(52) U.S. Cl. .................. 700/66; 700/90; 700/220; 700/221; 340/572.1; 340/10.1

(58) Field of Classification Search ............ 700/90, 700/220, 221, 66; 340/572.1, 10.1
See application file for complete search history.

(56) References Cited

U.S. PATENT DOCUMENTS

| 4,623,887 A | 11/1986 | Welles, II |
| 4,894,789 A | 1/1990 | Yee |
| 4,959,810 A | 9/1990 | Darbee et al. |
| 5,005,084 A | 4/1991 | Skinner |

(Continued)

FOREIGN PATENT DOCUMENTS

| EP | 0561435 A2 | 9/1993 |
| EP | 0967797 A2 | 12/1999 |

(Continued)

OTHER PUBLICATIONS

Universal Electronics Inc., PRONTO User Guide, 1999, pp. 1-56.

(Continued)

*Primary Examiner*—Michael D. Masinick
(74) *Attorney, Agent, or Firm*—Greenberg Traurig LLP

(57) ABSTRACT

A home control and automation system and method. The system generally includes one or more wireless remote controls, a plurality of appliances (including network enabled appliances and traditional legacy appliances in the exemplary system), associated control centric devices, and associated content centric devices. Various methods for control and operation of appliances in the networked home control and automation environment are disclosed. Specifically, methods are disclosed which enable advanced home control features such as location based control setup and operation, network enabled legacy appliances and system integration, save and recall capabilities for appliance and media states, generic command based appliance controls, dynamic/complex macro command generation, and Internet based control capabilities from remote locations are disclosed in conjunction with the system of the current invention.

20 Claims, 7 Drawing Sheets

U.S. PATENT DOCUMENTS

| | | | |
|---|---|---|---|
| 5,101,191 A | 3/1992 | MacFadyen et al. | |
| 5,109,222 A | 4/1992 | Welty | |
| 5,293,357 A | 3/1994 | Hallenbeck | |
| 5,307,055 A | 4/1994 | Baskin et al. | |
| 5,410,326 A | 4/1995 | Goldstein | |
| 5,481,256 A | 1/1996 | Darbee et al. | |
| 5,552,806 A | 9/1996 | Lenchik | |
| 5,565,888 A | 10/1996 | Selker | |
| 5,574,964 A | 11/1996 | Hamlin | |
| 5,614,906 A | 3/1997 | Hayes et al. | |
| 5,635,989 A | 6/1997 | Rothmuller | |
| 5,642,303 A | 6/1997 | Small et al. | |
| 5,648,760 A | 7/1997 | Kumar | |
| 5,652,613 A | 7/1997 | Lazarus et al. | |
| 5,671,267 A | 9/1997 | August et al. | |
| 5,710,605 A | 1/1998 | Nelson | |
| 5,724,106 A | 3/1998 | Autry et al. | |
| 5,751,372 A | 5/1998 | Forson | |
| 5,761,606 A | 6/1998 | Wolzien | |
| 5,767,919 A | 6/1998 | Lee et al. | |
| 5,793,438 A | 8/1998 | Bedard | |
| 5,801,787 A | 9/1998 | Schein et al. | |
| 5,828,419 A | 10/1998 | Bruette et al. | |
| 5,835,864 A | 11/1998 | Diehl et al. | |
| 5,838,775 A | 11/1998 | Montalbano | |
| 5,855,006 A | 12/1998 | Huemoeller et al. | |
| 5,900,875 A | 5/1999 | Haitani et al. | |
| 5,901,366 A | 5/1999 | Nakano et al. | |
| 5,910,776 A * | 6/1999 | Black | 340/10.1 |
| 5,915,026 A | 6/1999 | Mankovitz | |
| 5,938,757 A | 8/1999 | Bertsch | |
| 5,956,025 A | 9/1999 | Goulden et al. | |
| 5,959,751 A | 9/1999 | Darbee et al. | |
| 5,970,206 A | 10/1999 | Yuen et al. | |
| 5,974,222 A | 10/1999 | Yuen et al. | |
| 6,002,394 A | 12/1999 | Schein et al. | |
| 6,002,450 A | 12/1999 | Darbee et al. | |
| 6,014,092 A | 1/2000 | Darbee et al. | |
| 6,018,372 A | 1/2000 | Etheredge | |
| 6,020,881 A | 2/2000 | Naughton et al. | |
| 6,028,599 A | 2/2000 | Yuen et al. | |
| 6,040,829 A | 3/2000 | Croy et al. | |
| 6,097,441 A | 8/2000 | Allport | |
| 6,104,334 A | 8/2000 | Allport | |
| 6,127,941 A | 10/2000 | Van Ryzin | |
| 6,130,726 A | 10/2000 | Darbee et al. | |
| 6,133,909 A | 10/2000 | Schein et al. | |
| 6,137,549 A | 10/2000 | Rasson et al. | |
| 6,151,059 A | 11/2000 | Schein et al. | |
| 6,172,674 B1 | 1/2001 | Etheredge | |
| 6,177,931 B1 | 1/2001 | Alexander et al. | |
| 6,195,589 B1 | 2/2001 | Ketcham | |
| 6,211,856 B1 | 4/2001 | Choi et al. | |
| 6,219,694 B1 | 4/2001 | Lazaridis et al. | |
| 6,225,938 B1 | 5/2001 | Hayes et al. | |
| 6,256,019 B1 | 7/2001 | Allport | |
| 6,278,499 B1 | 8/2001 | Darbee et al. | |
| 6,285,357 B1 | 9/2001 | Kushiro et al. | |
| 6,341,374 B2 | 1/2002 | Schein et al. | |
| 6,369,840 B1 | 4/2002 | Barnett et al. | |
| 6,408,435 B1 | 6/2002 | Sato | |
| 6,437,836 B1 | 8/2002 | Huang et al. | |
| 6,448,886 B2 * | 9/2002 | Garber et al. | 340/10.1 |
| 6,463,463 B1 | 10/2002 | Godfrey et al. | |
| 6,466,971 B1 | 10/2002 | Humpleman et al. | |
| 6,532,589 B1 | 3/2003 | Proehl et al. | |
| 6,563,430 B1 | 5/2003 | Kemink et al. | |
| 6,577,350 B1 | 6/2003 | Proehl et al. | |
| 6,587,067 B2 | 7/2003 | Darbee et al. | |
| 6,753,790 B2 | 6/2004 | Davies et al. | |
| 6,774,811 B2 * | 8/2004 | Kaufman et al. | 340/825.49 |
| 6,792,323 B2 | 9/2004 | Krzyzanowski et al. | |
| 6,823,188 B1 * | 11/2004 | Stern | 455/456.1 |
| 6,832,251 B1 | 12/2004 | Gelvin et al. | |
| 6,996,402 B2 * | 2/2006 | Logan et al. | 455/456.1 |
| 2003/0076240 A1 | 4/2003 | Bae et al. | |
| 2004/0203592 A1 | 10/2004 | Kermode et al. | |
| 2005/0035846 A1 | 2/2005 | Zigmond et al. | |
| 2005/0138785 A1 | 6/2005 | Moore et al. | |
| 2005/0242167 A1 | 11/2005 | Kaario et al. | |

FOREIGN PATENT DOCUMENTS

| | | |
|---|---|---|
| EP | 0987888 A1 | 3/2000 |
| EP | 1204275 A2 | 5/2002 |
| EP | 1023650 B1 | 9/2003 |
| GB | 2343073 A | 4/2000 |
| JP | 02001209551 A | 8/2001 |
| WO | WO 00/40016 | 7/2000 |
| WO | WO 00/58935 | 10/2000 |
| WO | WO 01/20572 A1 | 3/2001 |

OTHER PUBLICATIONS

"The untold RFID Story: Product innovations in Electronics" — IBM Business Consulting Services, ibm.com/bcs, Sep. 2004.

"Interacting with Home and Home Appliances in a Hand-Held Terminal", Aaltonen et al. Nokia Research Center.

"A Method of Appliance Detection Based on Features of Power Waveform" -Masahito et al. Tokyo University of Technology School of Computer Science, 2004 IEEE

* cited by examiner

SYSTEM AND METHODS FOR HOME APPLIANCE IDENTIFICATION AND CONTROL IN A NETWORKED ENVIRONMENT

RELATED APPLICATION DATA

This application claims the benefit of and is a divisional of U.S. application Ser. No. 11/047,441, filed Jan. 31, 2005, which is a continuation-in-part of U.S. application Ser. No. 10/978,860, filed Nov. 1, 2004, which, in turn, claims the benefit of U.S. Provisional Application Ser. No. 60/517,283, filed on Nov. 4, 2003, which applications are hereby incorporated by reference in their entirety.

BACKGROUND

The following relates generally to home control systems and, more particularly, relates to a system and associated methods for controlling and operating a plurality of home appliances from a variety of different locations in a networked home control and automation environment.

Current home appliances and associated remote controls ("legacy" appliances) have limited functional abilities and minimal interoperability features. Emerging advances in wireless and distributed computing technologies, coupled with network enabled home appliances (such as those that may be addressed, accessed, monitored, and managed remotely over networks and the Internet) and industry wide interoperability standards (e.g., Universal Plug and Play ("UPnP") and Home Audio Video interoperability ("HAVi") standards) provide a rough framework for network enabled home environments having increasingly integrated home control capabilities, functions, and features. A background and overview of home interoperability technologies and projected features may be found in the Intel Technical Journal, Volume 6, Issue 4, published Nov. 15, 2002 entitled "Interoperable Home Infrastructure" which is fully incorporated by reference herein.

Though promising in their goals and objectives, the UPnP, HAVi, Intel Interoperability Infrastructure, etc. do not currently provide for many advanced control based features relating to networked home control and automation environments. Accordingly, it is desired to provide a system and method that functions to enable advanced home control features such as location based control setup and operation, network enabled legacy appliances and system integration, save and recall capabilities for appliance and media states, generic command based appliance controls, dynamic/complex macro command generation, and Internet based control capabilities from remote locations. Additional inventive features and functions will also be evident from the home appliance control system and methods hereinafter described.

SUMMARY

In accordance with these needs and desires, a control system and associated methods for control and operation are described for use in a networked home control and automation environment.

Generally, the system includes one or more wireless remote controls, a plurality of appliances (including network enabled appliances and traditional legacy appliances in the exemplary system), associated control centric devices (generally devices whose chief function is providing control based functions and services, including but not limited to control pods, control servers, device state monitors, etc.) and associated content centric devices (generally devices whose chief function is providing content based functions and services, including but not limited to content managers, content servers, content renderers, etc.).

Additionally, various methods for control and operation of appliances in the networked home control and automation environment are disclosed. Specifically, methods that function to enable advanced home control features such as location based control setup and operation, network enabled legacy appliances and system integration, save and recall capabilities for appliance and media states, generic command based appliance controls, dynamic/complex macro command generation, and Internet based control capabilities from remote locations are disclosed in conjunction with the system of the current invention.

A better understanding of the objects, advantages, features, properties and relationships of the subject system and methods will be obtained from the following detailed description and accompanying drawings which set forth illustrative embodiments which are indicative of the various ways in which the principles of the system and method may be employed.

BRIEF DESCRIPTION OF THE DRAWINGS

For a better understanding of the system and method described hereinafter, reference may be had to preferred embodiments shown in the following drawings in which.

DETAILED DESCRIPTION

Figure 1:
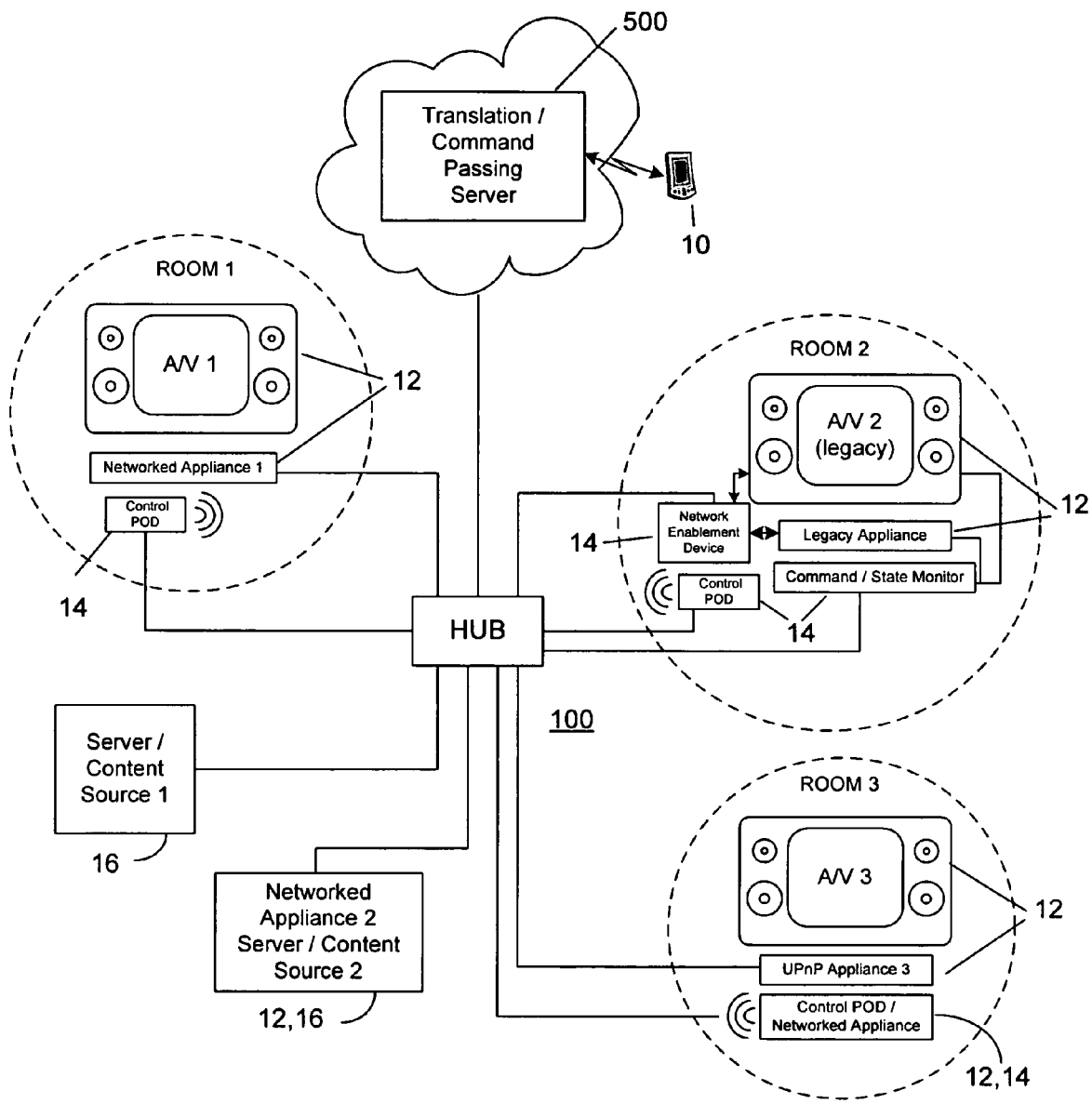
FIG. 1 illustrates an exemplary networked home control and automation system.

With reference to the Figures, an integrated home control system and associated control and operation methods are described for use in a networked home control and automation environment.

The system envisaged by the current invention provides for both the interoperability of various network enabled and legacy home appliances, and advanced command and control functions for such appliances. To this end, the networked home control and automation system (shown generally in FIG. 1) includes one or more remote controls 10, a plurality of appliances 12 (including network enabled appliances and traditional legacy appliances in the exemplary system), associated control centric devices 14 (generally devices whose chief function is providing control based functions and services, including, but not limited to, control pods, control servers, device state monitors, etc.) and associated content centric devices 16 (generally devices whose chief function is providing content based functions and services, including, but not limited to, content managers, content servers, content renderers, etc.).

By way of example only, the appliances 12 may include, but are not limited to, televisions, VCRs, DVRs, DVD players, cable converter boxes, amplifiers, CD players, game consoles, home lighting, drapery, fans, HVAC systems, thermostats, personal computers, security systems, network enabled automobiles, etc. According to the exemplary system, some or all of the above devices, appliances, and components are configured to be network enabled and interoperable (e.g., as defined and described in the UPnP and/or HAVi specifications which can be found at the upnp.org Web site and the havi.org Web site respectively, which specifications are incorporated herein by reference in their entirety) such that basic device addressing, accessibility, monitoring, remote management, and other network communication based features are possible in a home control and automation environment. The networked home control and automation environment 100 itself may utilize well known centralized networking methods, ad hoc networking methods (including peer-to-peer networking), powerline or phoneline based networking methods, or a combination of the above (whether wired or wireless) to accomplish the features and goals of the present invention. Additionally, it will be appreciated that particular appliances, devices, and components of the exemplary system may incorporate some or all of the features, functions, and capabilities of other individual devices such that a minimal number of separate physical devices are required in a given home environment to accomplish the goals of the current invention. For instance, devices such as a Media Center PC or network enabled TV (e.g., one compliant with the UPnP and/or HAVi specifications) may include, in additional to standard computing and/or audio/video playback functions, system wide control capabilities, content management and rendering abilities, and location based services. As such it will be appreciated that the various system elements defined and described herein should be considered as functional modules capable of implementation individually or collectively in a single physical device or a software module in a software product, or one or more elements may be implemented in separate physical devices or software modules, without departing from the scope and spirit of the present invention.

Figure 2:
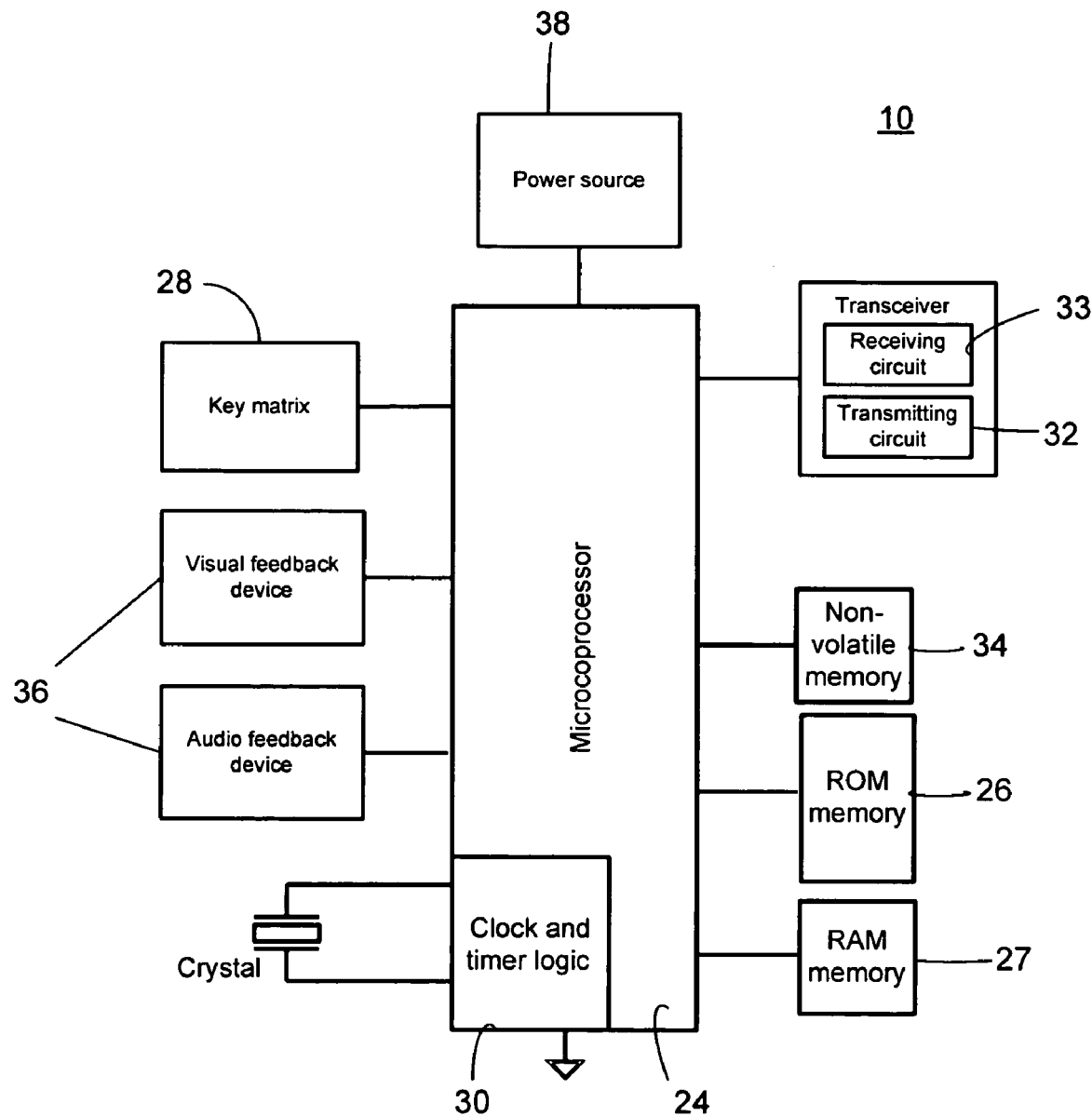
FIG. 2 illustrates a block diagram of components of an exemplary remote control.

Looking now to FIG. 2, for use in transmitting command codes, generic commands, macro commands, etc. to one or more of the appliances (both network enabled and legacy) the remote control 10 may include, as needed for a particular application, a processor 24 coupled to a memory device (such as ROM memory 26, RAM memory 27, and/or a non-volatile memory 34), a key matrix 28 (e.g., physical buttons, a touch screen display, or a combination thereof), an internal clock and timer 30, transmission circuit(s) 32, receiver circuit(s) 33, and/or transceiver circuit(s) (e.g., IR and/or RF), a means 36 to provide feedback to the user (e.g., LED, display, speaker, and/or the like), and a power supply 38 as generally illustrated in FIG. 2. As will be understood by those of skill in the art, the memory device may include executable instructions that are intended to be executed by the processor 24 to control the operation of the remote control 10. In this manner, the processor 24 may be programmed to control the various electronic components within the remote control 10, e.g., to monitor the power supply 38, to cause the transmission of signals, etc.

The non-volatile read/write memory 34, for example an EEPROM, battery-backed up RAM, Smart Card, memory stick, or the like, may be provided to store setup data and parameters as necessary. It is to be additionally understood that the memory devices may take the form of any type of readable media, such as, for example, ROM, RAM, SRAM, FLASH, EEPROM, Smart Card, memory stick, a chip, a hard disk, a magnetic disk, and/or an optical disk. Still further, it will be appreciated that some or all of the illustrated memory devices 26, 27, and 34 may be physically incorporated within the same IC chip as the microprocessor 24 (a so called "microcontroller") and, as such, they are shown separately in FIG. 2 only for the sake of clarity.

To identify home appliances by type and make (and sometimes model) such that the remote control device 10 is adapted to transmit recognizable command codes in the format appropriate for such identified appliances 12, data may be entered into the universal remote control device 10. Since methods for setting up a remote control to control the operation of specific home appliances are well-known, such methods need not be described in greater detail herein. Nevertheless, for additional information pertaining to remote control setup, the reader may turn to U.S. Pat. Nos. 4,959,810, 5,614,906, and 6,225,938. It will also be appreciated that the remote control 10 may be set up to control an appliance 12 by being taught the command codes needed to control such appliance as described in U.S. Pat. No. 4,623,887.

To cause the remote control 10 to perform an action, the remote control 10 is adapted to be responsive to events, such as a sensed user interaction with the key matrix 28, receipt of a transmission, etc. In response to an event, appropriate instructions within the memory 26 may be executed. For example, when a command key is activated on the remote control 10, the remote control 10 may retrieve a command code corresponding to the activated command key from memory 26 and transmit the command code to a device in a format recognizable by the device. It will be appreciated that the instructions within the memory 26 can be used not only to cause the transmission of command codes and/or data to the appliances 12 but also to perform local operations, e.g., location based features and functions as described in greater detail below. While not limiting, other local operations that may be performed by the remote control 10 include displaying information/data, favorite channel setup, macro button setup, function key relocation, etc. Examples of local operations can be found in U.S. Pat. Nos. 5,481,256, 5,959,751, and 6,014,092. Additional examples of remote controls 10 may be found in commonly owned, U.S. Pat. No. 6,225,938 and U.S. application Ser. Nos. 60/264,767, 09/905,423, 09/905,432, and 09/905,396.

Remote control 10 may also include, as needed for a particular application, CCD or other imaging sensors, microphone, and/or touchscreen display for receipt of various types of user input for effecting operations of the remote control. Remote control 10 may also be configured to include appliance, control server, and content server functions, as will be described in greater detail below. For instance, remote control 10 may be implemented on a laptop computer, smart panel, tablet PC, wireless enabled PDA, mobile phone, etc which may all include programming to cause remote control 10 to playback music, videos, pictures and the like, monitor appliance feature and state tables for advanced control functions, and include programming for location determination methods. Remote control 10 may thus be viewed as a wireless appliance having functions similar to less portable appliances of the networked control environment, and as such the following discussions and descriptions of the remote controls, and controlling devices in general, should be taken in the broadest sense possible.

Each network enabled appliance of the system (including legacy appliances that have been network enabled as described in greater detail below) include, or are assigned a unique address. According to the exemplary embodiment, this address is in the form of a Uniform Resource Identifier (URI) which can be any Uniform Resource Locator (URL) or Uniform Resource Name (URN), typically assigned via a control server of the system, such that all appliances in communication with the control server may be accessed from at least the control server. It will be appreciated that multiple appliances may include control and addressing functions in a given system such that each individually addressed appliance may be accessed by multiple control servers, control pods, or other control devices. Additionally, it will be understood that networked devices need not include fully functional web server applications or similar features, but may be configured to simply broadcast and/or listen on specified IP ports to accomplish system connectivity and communications.

Network enabled appliances of the system additionally include basic feature and state reporting functions for enabling other appliances, control server(s), and remote control(s) to readily ascertain the available control functions of an appliances, and the current state of the control functions. As will be appreciated by those skilled in the art, an Extensible Markup Language (XML) or similar format may be used to transmit and receive such information between appliances, servers, and remote controls. It is also possible to modify the URI or other unique identifier assigned each appliance such that contained in each appliance address is an indication of the available functions, and even an indication of current appliance state. One method of implementing such a system would be to include appropriate device code identifiers (e.g., an IR command library, individual IR code, and/or graphical user interface element reference number(s)) in the URI for each appliance, thus broadcasting capabilities (and thus available features) of the device to any control server with access to the associated device library. One example appliance address (URI) may be "http://123.456.789.0/wxyz," where "123.456.789.0" is the main appliance address, and "wxyz" in the reference number corresponding to an IR command code set for that particular appliance.

For enabling frequent feature set and state updates of appliances present in the networked control environment on associated control servers and remote controls, well known multicasting methods for appliance advertising and discovery may be used (e.g., IP Multicasting). In this way appliances, servers, and remote controls may easily monitor and register feature set and state changes on the networked control environment.

As described above and shown in FIG. 1, the control and content servers (including control pods, command/state monitors, content renderers, etc.) of the present invention may be separate devices, may be incorporated into one or more of the appliances such that no individual "server devices" are present, etc. Functionally, content centric devices can serve as a repository for digital media files (audio, video, photo, and multimedia content), offer search and cataloging based services, and serve files to one or more appliances for playback. Generally computing based devices such as Media Center PC's, "Content Servers," and "Content Renderers," as defined and described in, for example, the UPnP specification, are examples of content centric devices in a home control and automation environment.

Control centric devices generally function to receive, save, process, and transmit media and state data for appliances and devices of the home control and automation environment. Various types of command data (IR, RF, Powerline commands, Phoneline commands, etc.) may be saved by command/state monitors as described in greater detail below. Whether implemented on a single device, or distributed across multiple devices in the home control and automation environment, these control devices are capable of performing logic based operations on saved command and state data for use with appliances, remote control interfaces, and desired user functions. Preset control instructions on control devices may dictate how and when command and state data is captured and processed, or user interaction with an appliance or remote control device may dictate the manner of command and state data capture and processing. Saved and/or processed command and state playback may likewise be effectuated by preset instructions, automated system processes, or user interaction with appliances and devices of the system.

Generally, the functions performed by a particular control device will depend on included firmware, software and programming, additional components, and level of integration with other appliances of the system. As such the general control device as shown and described in FIG. 3 may be configured and modified as further described herein to function as a location signaling device, network enablement device, command/state monitor, control pod, network bridge (such as for example an IR, RF, X-10, or Simple Control Protocol (SCP) bridge), or any combination of the above. The control device may also be fully incorporated into any of the appliances of the home environment as a functional element (i.e., as a service or application software running on the appliance).

Figure 3:
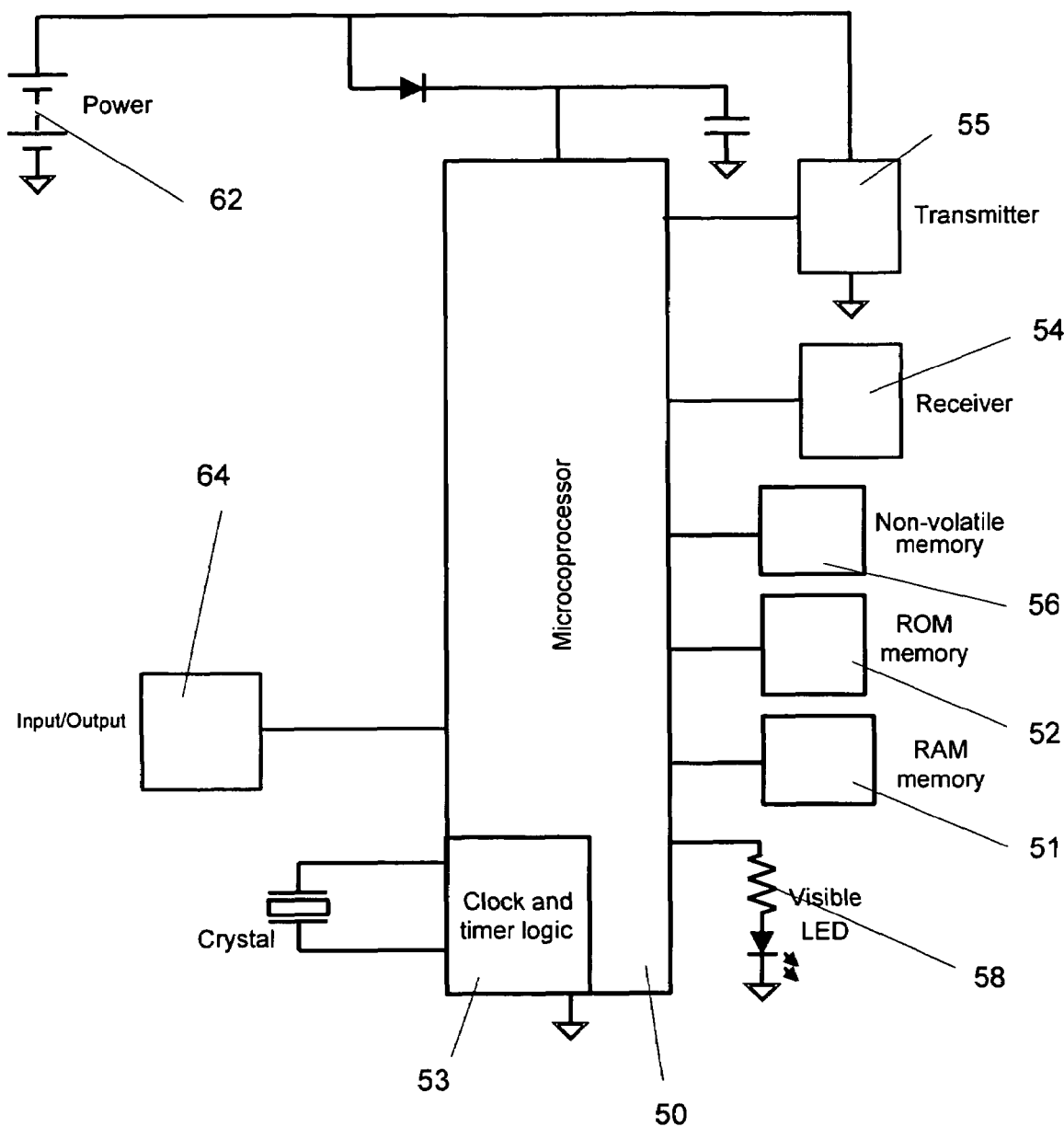
FIG. 3 illustrates a block diagram of components of an exemplary control device.

For use in accomplishing one or more of the above described control features in the networked control and automation system, a control device 14 is described. The control device 14 may be a device separate and apart from the other system appliances or may be integrated into one or more of the appliances as is illustrated in FIG. 1. In either case, the control device 14 may include, as needed for a particular application, a processor 50 coupled to a memory device (such as ROM memory 52, RAM memory 51, and/or non-volatile read/write memory 56), an internal clock and timer 53, receiver circuit(s) 54, transmission circuit(s) 55 and/or transceiver circuit(s) (e.g., IR and/or RF), a means 58 to provide feedback to the user (e.g., LED, display, speaker, and/or the like), a power supply 62, and input/output means 64, (e.g., serial I/O port, wireless transceiver, bar code scanner, X-10 bridge, SCP Bridge, Ethernet port, etc.), as is generally illustrated in FIG. 3. The memory device may include executable instructions that are intended to be executed by the processor 50 to control the operation of the control device 14. In this manner, the processor 50 may be programmed to control the various electronic components within the control device 14, e.g., to monitor the power supply 62, to cause the transmission of signals, to provide audio or visual prompts to a user, etc. The non-volatile read/write memory 56, for example an EEPROM, battery-backed up RAM, Smart Card, memory stick, or the like, may also be provided to store setup data and parameters as necessary. While the memory 52 is illustrated and described as a ROM memory, memory 52 can also be comprised of any type of readable media, such as ROM, RAM, SRAM, FLASH, EEPROM, or the like. Preferably, the memory 56 is non-volatile or battery-backed such that data is not required to be reloaded after battery changes. In addition, the memories 51, 52 and 56 may take the form of a chip, a hard disk, a magnetic disk, and/or an optical disk. It will also be appreciated that in cases where control device capability is integrated into an appliance, some or all of the functional elements described above in conjunction with FIG. 3 may be combined with similar elements already present in the appliance for other purposes.

It will be appreciated that the abovementioned transmitter 55, receiver 54, and/or input/output means 64 may be used to connect control device 14 to one or more networked appliances, content servers, computers, the Internet, or other devices and appliances of a networked home control environment. As such programming and instructions on the control device may control the operation of other devices and appliances in the system, access content and command data stored or maintained either entirely or in part at a location physically separate from the control device 14 (such as for example in a server or personal computer located elsewhere in the home or remotely via the Internet), and communicate wirelessly with a remote control unit to accomplish command and control features of the current invention.

In order to enable location based control and automation functions, a remote control position determination system and method is described in conjunction with the networked control environment of the present invention. In general, the remote control position determination system includes one or more location signaling devices within multiple control environments (or control zones), each control environment including home appliances operable by the remote control. In one exemplary system of the remote control position determination system, a location signaling device (i.e., one implementation of control device 14) is placed within each control environment in order to send one or more signals to the remote control for location determination operations. Various methods for determining the location of the remote control relative to the various control environments and zones, or similarly determining the proximity of various home appliances to the remote control are disclosed, as well as methods for using determined location information to dynamically reconfigure default command set and/or macro commands on the remote control to control a desired appliance or multi-appliance function. An exemplary remote control position determination system and method is described in greater detail in co-pending U.S. patent application Ser. No. 10/978,971 entitled "System And Method for Controlling Device Location Determination" which is owned by a common assignee and incorporated herein by reference in its entirety.

By implementing a remote control location determination system with the networked home control environment of the present invention, many additional functions and features can be accomplished. For instance, a remote control may determine its location based on appliance signaling and unique identifiers, then the location data for the remote control may be formatted and broadcast as a data transmission (i.e., XML format or in a URI as described below) to all appliances in the environment. In this way, specific location based services and functions may be performed by any and all devices in the networked environment on an ongoing basis based on the broadcast remote control location state data. It will be appreciated that the determined state data may be published as a device feature or state of the remote control (or by any other appliance in the system having access to remote location data) using for example Simple Service Discovery Protocol (SSDP), XML, or other methods as described in the UPnP specification. It may also be possible to modify the URI or other appliance identifier such that the broadcast and/or discoverable address contains specific information (e.g., appliance location, device state, services available, etc.) relating to the appliance in addition to the device address. By way of example only, the device address for a specific appliance may be formatted as follows to indicate additional information in conjunction with the address: http://Address/Location/StateData/ServicesData, where "Address" is the network address of the device, "Location" is the physical location relating to the environment the device is in, "StateData" includes one or more indications of the device state, and "ServicesData" includes an indication of the services offered by the device. Other methods of publishing determined location state data are possible given the disclosure and such methods are well within the routine skill of a programmer skilled in the art.

Based on the present location of the remote control in an environment, only those appliance within a specified proximity to the remote control may be caused to report their function and state data, or commands transmitted from the remote control may be prioritized for appliances that are determined to be in close proximity to the remote control at any given time. Dynamic and/or complex macro commands (as described in greater detail below) may be configured to cause appliance states to change any time a particular location is reported by the remote control (e.g., lighting fixtures may be configured to receive location data based on the remote control location determination and modify their power state or brightness level continuously based on remote control location).

The remote control location determination data may also be used to provide error correction or checking mechanisms for commands issued in a home automation environment. For instance, if a remote control location outside the home control environment is detected (for example if the remote control is connected to the home network from a remote location via the Internet) and a command from the home automation system activates the oven in the home, a prompt may be sent to the remote control inquiring whether such command to the oven was correct based on the detected location of the remote.

It may be advantageous in such a scenario to initiate a location determination request from one or more of the appliances or control devices within the home network, rather than from the remote control. The request from the appliances or control devices may be in the form of a signal response (based on a command issued from another appliance or control server rather than a signal request from the remote control) which provides location data to the remote. Once in receipt of the location data the remote control may make a position determination and broadcast its position data to all networked appliances.

Additional functions and features of the remote control location determination system and method will be apparent from the description herein and the above referenced document entitled "System And Method for Remote Control Location Determination."

Current legacy appliances in home entertainment systems do not include network based functions and features. Although many new devices are network enabled (such as those that are UPnP and/or HAVi compliant) and provide desirable features to a consumer, replacing all home entertainment devices currently in a consumer's home would be costly and burdensome to the consumer. Additionally, it is anticipated that appliance manufacturers will only gradually merge network enablement features into their model lineups, beginning at the high end, and it will thus be a considerable time before all possible appliances are network enabled. Thus, it will be advantageous to provide for the integration and incorporation of such legacy-based appliances in a networked home control and automation environment.

Therefore a network enablement device is provided in the current invention which serves to control, integrate, extend, and monitor non-networked devices via network protocols and methods (e.g., via the UPnP protocol over an IP based network). The purpose of network enabling such non-networked appliances is to provide seamless integration of all appliances and devices in a networked home control and automation environment.

As described above, a control device to network enable legacy appliances of the current invention (a "network enablement device") may be a single physical device, or may be combined as a functional element of other devices, appliances, and components of the system. It will also be appreciated that the network enablement device may support several legacy devices simultaneously, and need not be deployed in a one-to-one fashion for each legacy device of the system.

In a basic embodiment, the network enablement device (such as may be configured using the control device 14 shown in FIG. 3) includes a consumer IR (CIR) to network bridge such that commands to and from the legacy appliance to which the network enablement device is connected may be saved, monitored, processed, etc. In addition to IR blasting capability, the network enablement device is able to emulate multiple networked devices (e.g., UPnP compliant devices) that encapsulate the functionality of legacy consumer electronics devices that are only controllable via standard CIR commands. For example, if a network enablement device is configured in conjunction with a legacy DVD player, then the network enablement device (including a CIR bridge) could announce and emulate a virtual networked media renderer device, supporting, for example AV transport, rendering control, and connection manager services (e.g., as defined and described in the UPnP specification). The network enablement device could also serve to provide remote 10 interfaces for each simulated device (e.g., as also described in the UPnP specification).

Figure 4:
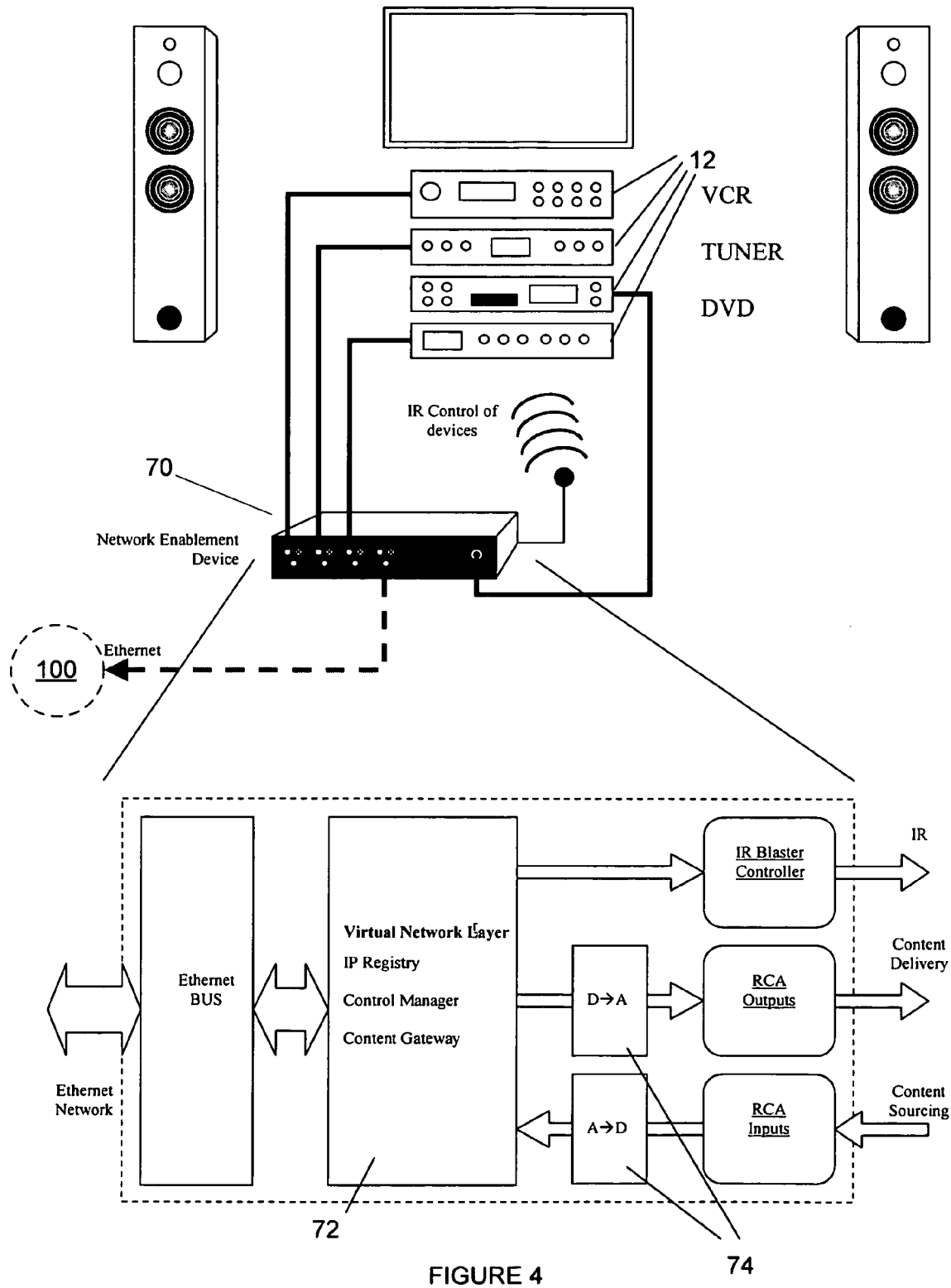
FIG. 4 illustrates an exemplary network enablement device.

As shown in FIG. 4, the network enablement device 70 is connected to the networked environment 100 and provides a superficial mask (assigned IP address) via a virtual network layer 72 for control and content access of the underlying legacy device(s) 12 as well as content converter(s) 74 (in most cases analog to digital converters and vice versa) to return over the networked environment the content in a format as if the original legacy appliance was a network enabled appliance (e.g., a UPnP compliant device). The network enablement device can mask multiple legacy appliances by assigning a unique virtual IP address, session ID, or instance to each legacy appliance which the network enablement device is adapted to control. The network enablement device 70 may also be configured with the feature, state, and other information about the legacy appliances to be controlled. For example, the IR code or other similar identifying characteristics (serial number, RFID, barcode, make, model, etc.) gleaned from the legacy appliance may be referenced with an existing device database, such as an IR code library or model/feature list located locally or at a remote location and accessed via the network, to determine feature, state, and other information. Once stored within network enablement device 70, the feature and state information for each legacy appliance may be broadcast to other devices on the networked control environment via SSDP, XML, etc. (e.g., as described in the UPnP specification).

Software or other programming on the network enablement device may thus create the necessary virtual network appliances corresponding to each connected legacy appliance based on the type of appliance, its gathered state, feature, and other information. For example, a legacy TV/VCR combo connected to network enablement device 70 might result in the generation of a network enabled media renderer, as well as a networked media server. The virtual media renderer corresponding to the TV may support a rendering control service (e.g., as described in the UPnP specification) to provide channel control as well as picture adjustment. It may also provide an AV transport control that would allow for control of the VCR. Lastly, the virtual media server would need both content directory and connection manager services in order to provide access to the AV outputs of connected legacy appliances. Outputs of the connected legacy appliances are routed to corresponding inputs on the network enablement device.

The network enablement device can utilize SSDP or similar protocol to respond to discovery attempts by control centric devices of the system, as well as handle all periodic availability/unavailability announcements for the virtual networked devices. The network enablement device may be configured to accept network control packets (e.g., UPnP based control packets) for its virtual devices and services, such as AV Transport, Rendering Control, Connection Manager, etc. The appropriate legacy appliance may thus be controlled via its native control medium (e.g., IR, RF, SLIP, X10, SCP, etc.), while digital media streams from other networked sources can be sinked to the virtual devices created by the network enablement device, and therefore the underlying legacy appliances, through the network enablement device's AV outputs. Media files or streams can be sourced from the virtual networked devices or storage media on the network enablement device and, therefore, the underlying legacy appliances through the network enablement device's AV inputs. These streams or files can then be sinked to other network enabled appliances in a standard manner. Within a networked home control and automation environment it would be advantageous to allow for saving and recalling appliance and media states, not only for a single home entertainment system, but also for use across multiple home entertainment systems which including many different appliances.

Generally, a user will initiate a save state command for a particular home entertainment center (typically a group of appliances) from which a movie, music, television broadcast, image, or other media element is being played. Any device that can transmit a unique coded signal in IR, RF or other protocol could be used to instigate the process of suspend, storing, transmitting and resuming the session state (e.g., LCD based remote, traditional tactile remote, single button remote, mobile wireless device, etc.) Both the playback state of the media, as well as the device configurations and settings during playback, will be saved either in a central data server (such as a media server connected to one or more devices of the home entertainment center), sent to the remote control to be saved, or a combination thereof. Once data has been saved it may be recalled at a later time in its current state to operate the devices and media of the same entertainment center from which it was saved, or it may be recalled (though the operation of devices by the data server and/or remote control) for a different home entertainment center having a set of analogous home appliances of different brand and/or model. In order to ensure that media playback and device state settings transfer correctly to the second home entertainment center devices, a set of device conversion definitions is applied to each data element from the first entertainment center (e.g., television settings data, audio receiver settings data, etc.) in order to ensure that data and commands saved from the first device(s) will translate appropriately to the analogous device(s) of the second entertainment center.

The media and appliance states able to be saved include, but are not limited to, current cable, satellite, or broadband channel being viewed, PPV or PVR program being viewed, MP3 play list with current track and track offset, Internet based audio or video streams, or any streaming content that can be paused and resumed. In is envisioned that Internet or other widely accessible network based content may be suspended and resumed from any set of state controllable A/V appliances that have access to Internet/network based content. For example, an Internet based video file could be started from within a home entertainment environment, paused by the user (e.g., via a pause or save state button on a remote control or PDA), and later resumed in a remote hotel room on a different entertainment environment which is controllable by the user (e.g., via the remote or PDA) and which is able to access the Internet based video file.

It is also envisioned that when integrated with a home control and automation environment, various location centric "state snapshots" may be saved in a remote control or by a central server for playback at a later time on any set of analogous appliances in the home. For instance, a save room command would capture all current media and appliances state setting for a given room, including lighting states (e.g., power and dimmer states), audio playback state (e.g., a given song playing on a given appliance), video playback state (e.g., a given video playing on a given appliance), room thermostat state for temperature settings, etc. Many such similar home, room, environment, or appliance specific states may be saved for subsequent recall and playback, using the same set of appliances or a set of analogous appliances. It will be understood that the extent of saved state data and associated data translation which may be necessary to accomplish a given playback operation depends on the number of particular appliances and media elements involved in a previous save state operation. It should also be understood that the state data saved may include locally-measured items gathered by the controlling device. For example, when the controlling device includes a microphone (e.g., is a PDA or a voice activated remote control, etc.) a measurement of the current volume level may be taken and saved. Upon resumption of playback, the media stream may be resumed one or two seconds back from the original pause point in order to allow a comparable volume measurement to be made and the sound level adjusted accordingly. Similarly, a controlling device which includes a light sensor (e.g., an LCD based unit with a sensor for automatic backlight control, an electroluminescent display based unit with automatic brightness control, etc.) may make local measurements of lighting levels in order to duplicate these when playback is resumed. In all cases, such locally measured data may be used as supplemental to, or in place of, inferred or explicit state data collected during operation of the appliances or equipment in question. The particular methods and techniques for scaling a simple single appliance media and state save and recall operation to support the saving and recalling of multiple appliance and media states will be apparent from the descriptions herein, as well as well within the routine skill of a programmer skilled in the art.

A better understanding of the objects, advantages, features, properties and relationships of the appliance and media state save and recall system and associated method are contained in U.S. provisional patent "System And Method for Saving and Recalling State Data for Media and Home Appliances" (Ser. No. 60/517,737) which is owned by a common assignee and incorporated herein by reference in its entirety.

In order to accomplish the described control features and functions, especially those relating to saving and recalling media states, dynamic macros, and generic remote commands, a system and method for monitoring and saving media and devices states may be incorporated with the home control and automation system of the current invention. Co-pending U.S. applications entitled "System and Method for Monitoring Remote Control Transmissions," (Ser. No. 10/603,839), and "System and Method for Monitoring Remote Control Transmissions," (Ser. No. 10/6665,650), both owned by a common assignee and fully incorporated by reference herein, describe a system and associated methods for such monitoring of macro commands and appliance states.

Generally, the command/state monitor receives a transmission from a remote control and determines if the transmission from the remote control includes a recognizable command code. When the transmission from the remote control is determined to not include a recognizable command code, a signal is generated to notify the remote control and/or user that an unsuccessful transmission was received. More specifically, the system includes a control device that has programming for determining if the transmission from the remote control includes all of the command codes in a sequence of command codes.

As described above, the command/state monitor need not be a separate physical device or appliance, rather it may be incorporated into one or more home appliances, or other control centric devices (such as the signaling device for location determination tasks etc.). Additionally, the command/state monitor may be a functional (i.e., software based) element of a control server or network enabled appliance according to the current invention. In general the command/state monitor permits one or more devices, appliances, or components of the home control and automation system to register current appliance and media states for use in many of the features and functions described herein. As such, when implemented in a networked control and automation environment, the command/state monitor may be configured to not only monitor, save and process commands initiated from the remote control, but also system level commands and control data that are issued from appliances, devices, or other system components other than the remote control. In this way the command/state monitor can functions as a central command/state repository, processing center, and arbiter for the whole, or select portions of the networked control environment.

The command/state monitor may register for events that an appliance or service may issue, thus providing a monitoring service for out of bound situations. In this way the command/state monitor can trigger or key off of a detected appliance or media state to accomplish a variety of control, alert, or automation functions. Triggering states or events may include, for example, temperature out of range in the house/hot tub, disk space limited on PVR, pay per view movie about to expire which has not been watched, oven has reached 350 degrees with food inside for 35 minutes, etc.

The command/state monitor (in conjunction with the home control and automation environment) could also perform macro based responses to state/event notifications, allowing for automated escalation or resolution of the problem. The notifications may be filtered based on preset user or system specific settings, or based on dynamic factors such as the location of the remote control, or the current user of the appliance or remote control. The command/state monitor may also be configured to re-direct the notifications based on time of day, day of week, severity, location of the remote control, etc. to a remote location (e.g., a users cell phone, PDA, etc.).

For effecting command and operation of appliances in a networked home control and automation environment, various command and control methods are described such as generic commands, dynamic commands, and complex macro commands. As will be appreciated by those skilled in the art, these commands may be effectuated by a simple remote control, or any remote control, command interface, or control device configured to send command data to a control device (e.g., dedicated remotes, universal remotes, LCD based remotes, PDA's, mobile phones, etc.). It is envisioned that a user will be able to effect command of appliances in one of several ways in a networked home control environment. For instance, a user may use one or more remote control units to send dedicated device specific commands to individual appliances, via an appropriate transport medium (e.g., IR, RF, X-10, SCP commands, etc.) These commands may be in the form of individual commands or may be preprogrammed or user definable macro commands such as described in U.S. Pat. No. 5,959,751. In most cases such remote controls should be capable of either storing large command databases and/or learning command codes for use with particular appliances.

In the case of a generic remote control, some of the remote control components described above (including the microprocessor, memory, transceiver, etc.) may be configured in a standalone control device (control pod) integrated with the networked home control and automation environment, or may be integrated as a functional elements of another appliance or device of the system (e.g., command/state monitor, signaling device, network enablement device, or any appliance of the system). An exemplary control pod may be configured using the general control device 14 as shown and described in FIG. 3.

To effect command and control of appliances in the system, the portable remote control device may be configured as a "generic" remote control with a minimal number of functional components, such that a user need only choose a minimal number of control buttons (or any other control initiator such as voice or gesture based commands) to control a desired activity or function. Thus devices such as mobile phones, PDAs, watches, dedicated remotes, and other simple wireless enabled devices may be configured as a "generic remote" using the system and method of the present invention. For example, a simple generic remote may include several function buttons (i.e. TV, Movie, Music, Lighting, etc) and several associated generic transport buttons (e.g., play, stop, shuffle, power on/off, volume, etc.). By pressing one function button (e.g., Lighting) the control pod may initiate a default action for a device connected to the control system that correspond most closely to the user indicated functions (e.g., turning the lights on if they are currently powered off). Additional button presses on the generic remote may communicate more information to the control pod which may better enable the control pod to determine the desired actions of the user (e.g., pressing "Movie" and "Play" on the generic remote may cause the control pod to power on the TV, DVD player, and Audio Receiver connected to the control pod, and begin playing a DVD).

The control pod itself may be set up and configured to control appliances and devices associated with it using a variety of methods, including user based setup from a PC (e.g., using device command codes to set up the control pod such as described in U.S. Pat. No. 6,587,067), dynamic setup through SSDP or other device discovery and setup protocols, device detection and learning methods via barcode reading or RFID tags (as described in co-pending, commonly assigned U.S. patent application entitled "System and Method for Setting Up A Universal Remote Control" (Ser. No. 10/665,642), and commonly assigned U.S. Pat. No. 6,225,938 entitled "Universal Remote Control System with Bar Code Setup.")

The generic remote may be configured to communicate with the control pod via any wireless medium (e.g., IR, RF, etc.) and the commands themselves (e.g., activity commands and/or generic transport commands) sent by the remote to the control pod may effect any desired action of the user. For example, as a user walks into a given room or control environment with the remote control, the location of the remote may be determined by the remote or control pod or the system using the remote location determination system and method as described above. The user may then press a "Movie" button on the remote plus a "Play" button, and rather than sending unique IR or RF codes to the particular devices to be controlled, the generic remote is configured to send a simple generic command (for "DVD" and "Play") to the control pod present in the room. Once in receipt of the location data, and generic command data, the control pod effects the desired appliance commands and states using programming, command codes, and an appropriate transmitter on the control pod. As such the actual "generic" remote control operated by the user need only be capable of sending basic commands, and need not contain a library of command codes, complex programming to effect commands of different type or protocol, or a robust transceiver for modulating different signal types or high frequency signals.

It will also be appreciated that a "generic" code can be a command code that would normally control the operation of a particular device of a particular manufacturer that, through the present invention, may nevertheless be used to trigger other operations not normally associated with that command code. In addition, a control pod can be preprogrammed to recognize a command code as being a "generic" code or can be taught to recognize any command code as being a generic code, for example, by means of learning a command code (from a remote) and associating the learned command code with the "generic" command code functionality. In this manner, an otherwise dedicated remote control can be converted to one having "generic" command capabilities.

Figure 6:
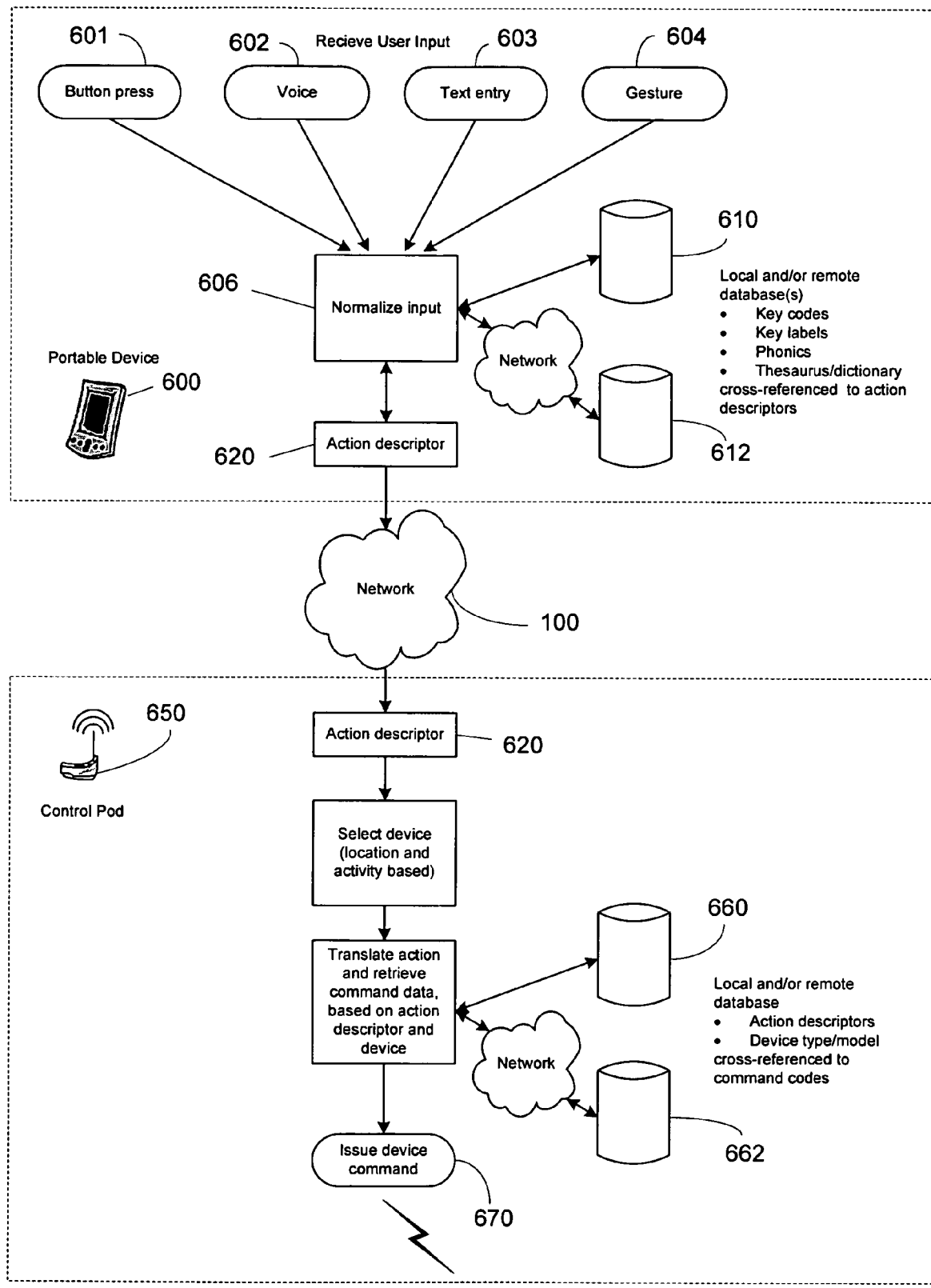
FIG. 6 illustrates an exemplary system for implementing a generic command structure within a home appliance network.

By way of more detailed example, turning now to FIG. 6, the user of an exemplary portable device 600 equipped to support generic command structures provides input indicative of a desired equipment state via a button press 601, spoken command 602, text 603 entry comprising either keystrokes, symbols, or handwriting recognition (such as is well known in PDA art—e.g., Palm Inc's "Graffiti"), gesture 604 either by way of touchpad or by physical motion of the device itself, etc. For illustrative purposes, if the desired equipment operation is commencement of play of the currently selected CD in the user's present location, any of the following inputs may be appropriate as supported by the particular portable control device: Pressing a "play" button presented on a CD device control page; speaking the phrase "CD play"; writing the characters "CD play" (or "CD" followed by an upward slash); or gesturing in an upward motion with the hand holding the remote control; etc. In all cases, portable device 600 may be equipped with programming 606 (generally algorithm or logic based instructions as may be appropriately configured by those skilled in the art)

to normalize such command input to a standard action descriptor (e.g. "CD Play") recognizable by any appropriately configured controlling device within the network, including portable device 600, control pod 650, etc. It will be appreciated that such command normalization may make use of local 610 or remote 612 databases as appropriate to decode and interpret command input(s) 601,602,603,604. Once the standard action descriptor 620 has been arrived at, further programming within portable device may cause the generation of an appropriate device command for controlling operation of the device, or the action descriptor may be transferred via the networked home control environment 100 to the appropriate control point, for example control pod 650, based upon the user's current location determined as described earlier.

Once in receipt of standardized action description 620, the control point, or portable device as described above, may then select an appropriate physical device(s) to which commands are to be directed based upon the equipment configuration and/or the current activity occurring in that location (listening to music, watching a movie, etc.), followed by reduction and translation of the requested action into specific physical device command(s) 670. Once again, it will be appreciated that the command translation process may make use of local 660 or remote 662 databases as appropriate, which database may be part of or separate from databases 610 and/or 612. It will further be appreciated that although described above in terms of a relatively simple exemplary command ("CD play"), more complex action descriptors may result in the issuance of sequences of commands to multiple devices as described in greater detail in the sections below. It will also be appreciated that the programming and instructions necessary to cause the portable device and/or other control devices to decode command input, perform state and device based operations, and other functions described above are well within the ordinary capabilities of one skilled in art, and that various algorithms, engines, and logic operations may be used in connection with the system and methods described herein to bring about a desired result.

Dynamic macro commands generally involve the application of variable data to a preconfigured macro, or system automated command event. For example, a remote control, control pod, or other control device may include preconfigured (i.e., user defined, predefined, or system generated) macro commands to effect advanced command and control operations in the home control environment. When implemented with the location determination system and method, however, some or all of the preconfigured macro commands may not function to bring about the desired result on a particular set of appliances, for instance when a user changes rooms or locations the commands may not control the appliances properly. Additionally, complex macro commands provide for the configuration of macro commands involving multiple command protocols (e.g., IR, RF, X-10, SCP, etc). For instance, a "Sleep" macro command for a given home control environment may involve sending IR commands to power off certain legacy appliances, RF commands to power off other appliances, and X-10 or SCP based commands to power off lights, close drapes, etc. To this end, a method of generating dynamic macro commands (which may also include generating and managing complex macro commands) is disclosed.

The methods of generating and managing dynamic and complex macro commands are based generally on preconfigured user preferences (such as system based preference, automation events, or user defined macro commands, etc.) and logic operations programmed on a remote control, control pod, or other control device of the networked control environment. In general a dynamic macro involves the operation of variable data plus control logic to an existing command (including a macro command) in order to consistently bring about a desired result when a user initiates the command. In the example above involving location data as the variable data, a particular macro for tuning to a users favorite channel could be automatically reconfigured as a user moved from one entertainment center to another. The initial macro command may have been configured to power on the TV, Audio Receiver, and Cable Box, and then to tune the Cable Box to a particular channel. As the user moves the remote from one entertainment center to another, programming in the remote (or on an associated control pod or other control device) functions to effectively reconfigure the power command for the TV, power command for the Audio Receiver, power command for the Cable Box, and channel tuning command for the Cable Box, in order to ensure that the correct channel is selected and played on each entertainment center for which the macro command is used.

In another implementation of the dynamic and complex macro generation concepts of the current invention, a simple channel change and/or volume up/down command may be caused to dynamically change based on the current location of the remote control. Fox example, if a user is listening to a particular song (e.g., an MP3 music file from an associated content server) in the same location as the particular entertainment center playing the music, the remote control (or control pod or other control device) may send IR commands to the Audio Receiver when a "Volume Up" command is issued from remote control. When the user moves to a different room containing a second entertainment center, the same "Volume Up" command may be effectively, dynamically reconfigured (using the new location data) to command the Audio receiver in the first room, for example, via RF transmissions, via a control pod which may complete the volume change by causing an IR command to the first Audio Receiver, etc. The save/recall state method and dynamic macro generation concepts of the present invention may also be combined. For instance, when issuing the same "Volume Up" command from a second location (containing the second entertainment system), the remote control or control pod may be configured to automatically save the current states from the appliances of the first location, effectively generate a new macro command for the appliances in the second location, and cause appropriate commands (including complex macro commands if necessary) to be transmitted for commanding the same song to continue playing (from the same position within the track) on the Audio Receiver in the second location, with the volume increased incrementally from the saved volume state of the first Audio Receiver.

For enabling more effective generation of dynamic and complex macro commands, a control based setup application wizard may be used to walk a user through the process of configuring the remote control, control pod, and/or other control device to effect operation of and manage the appliances, devices, and components of a particular control environment. After completing such a setup wizard, the user may initiate a process for the setup of automated macros, which will be generated based on the activity being requested, appliances being used, and functional aspects of the appliances.

One exemplary macro setup process is described as follows:

1) User picks the activities or tasks they wish to automate.
2) Depending upon the task, the wizard will test to see how each detected appliance functions.
   a. Is Enter required?
   b. Does the appliance support discrete codes?
   c. Does channel changing require a 0 prefix(es) for one or two digit numbers?
3) Once the wizard has established how the appliances function, the system will automatically generate macros for the particular user based on the system templates.

An exemplary Channel Favorite Setup via Internet website method is described as follows:
1) User selected ZIP code in which the equipment is located.
2) User selects service provider.
3) User selects service package information (e.g., subscription level).
4) User selects channels to be included in favorites lineup.
5) Once the user has entered the above information, the system will generate the macros to change channel based on the channel tuning devices they have in their home.

A URL and thumbnail image for each network appliance could be downloaded along with each macro sequence to enable enhanced graphic user interface functions of the remote control, control pod, or other control device.

An exemplary volume normalization setup Wizard may guide the user to move from room to room while monitoring the sound level of a standard test tone in each location using, for example, the built-in microphone found in many PDA devices which may be used as a controlling device and/or voice-activated remote controls. This information may then be stored at a central command/state monitor such as described earlier, for subsequent use during pause/resume playback operations to allow equivalent volume levels to be set in different locations. By way of further example, such a wizard may:

1.) Request the user to move to the first location and position the controlling device in the center of the room or listening area.

2.) Send sufficient "volume down" commands to guarantee that the sound reproduction apparatus in that room is set to its lowest possible volume setting.

3.) Initiate playback of a test tone on the reproduction apparatus.

4.) Issue a fixed number of "volume up" commands"

5.) Measure and store the level of sound detected via the built-in microphone.

6.) Request the user to move to the next location and repeat the process.

It will be appreciated that variations on this method are possible, for example, steps 4 and 5 above may be iterated several times in each location in order to make a series of sound measurements at different volume setting levels, building a profile of that equipment which takes into account non-linearities in its volume control response.

For enabling convenient and secure access to control appliances in the networked control and automation environment from remote locations, an address translation and remote command routing system and method are disclosed. As shown in FIG. 1, remote control 10 may connect to the networked home control environment 100 via a translation and command passing server 500 (shown as an Internet based server). In general, the address translation system and method involves the central registration of a home control environment or particular appliance IP numbers (or similar addressing protocol). In one particular embodiment of the address translation system, appliance functions and even current appliance and media states are registered along with IP numbers or other addresses at the central registry. A server or other device hosting the central registry may perform monitoring and alert functions (based on network or appliance address, functions, and current states) which may be delivered to an associated remote device (such as a wireless PDA, mobile phone, etc.). The Internet based server, home network, and/or particular appliances of the home network may periodically poll one another for purposes of updating the IP numbers or other addresses associated with appliances of the home network. In this way a remote device (such as a wireless PDA or mobile phone) may remain at all times able to communicate commands and other control functions to the home network by checking the central registry for updated dynamic IP numbers or other device addresses. It will also be appreciated that in some instances, the translation and command passing server may be configured such that it supports multiple redundant communication paths into the home, for example both Internet and direct dial, together with automatic routing algorithms to select the best available route based on for example, message/command urgency, data volume to be transferred, etc.

In one aspect of the address translation system, the remote device 10 need not request a network or appliance address update from the central server before issuing a command intended for a particular home based appliance or appliances. Rather, the remote device 10 sends a command request along with an associated appliance or command identifier (which serves to sufficiently identify the appliance (s) intended for operation by the user) directly to the translation and command passing server 500 which in turn completes the determination of any updated address for the intended appliances, and issues the intended command(s) to the home network 510 or directly to particular appliances 12. As will be appreciated by those skilled in the art, two way communication between the remote device (such as a remote control, wireless PDA, mobile phone, etc.) and home based appliances 12 may be effected using the current system and method of address translation and command passing such that commands, alerts, updates, and even content (e.g., audio, video, photos, multimedia, etc.) may be passed remotely between the home network (including particular appliances of the home network) and remote device.

By way of example, a service running on the address translation and command passing server (or a home network based service) could be configured to proactively notify someone when the temperature in the house was out of the desired range based on address and state updates from the home based thermostat. Likewise, a home based PVR could be controlled remotely using a remote device in conjunction with the address translation and command passing server to record, delete or view a program from a remote location. Alternatively, program recording requests could be entered into a PDA device equipped with a program guide data display, as contemplated in co-pending U.S. patent application Ser. No. 10/287,441 entitled "System and Method for Displaying an Electronic Program Guide and for Remotely Controlling the Recording Functionality of a Device", of like assignee and incorporate herein by reference in its entirety, and subsequently transferred to the home based PVR upon the PDA subsequently establishing connection to any wide area network capable of communicating with the address translation and command passing server 500.

Figure 5:
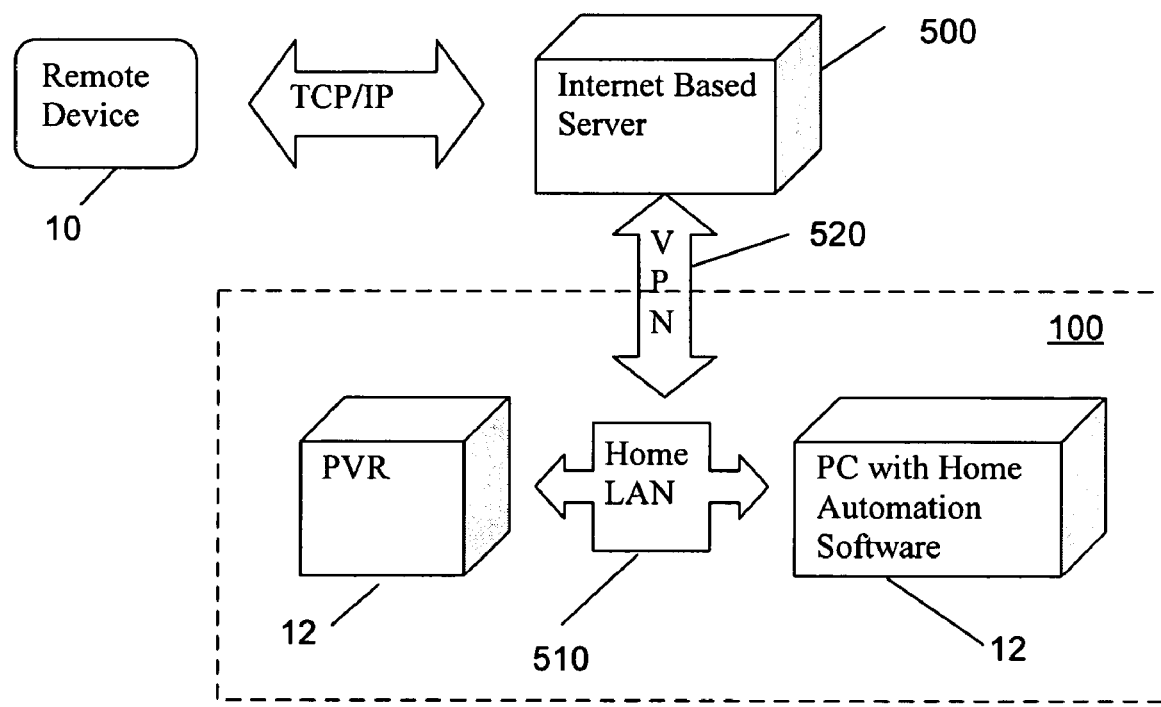
FIG. 5 illustrates a VPN implemented with the networked home control environment.

In order to provide for additional security in the remote access, control and management of the address translation and command passing system, several security features and aspects of the system are disclosed. A security certificate based solution (e.g., implementing security certificates or keys such as PKI certificates, PGP keys, etc.) may be used in conjunction with the address translation and command passing system. Additionally, Virtual Private Networks may be leveraged in order to provide increased security and access (such as through firewalls or other network based protective measures) in conjunction with the current system and method. To this end a method for remote proxy of Virtual Private Networks for simplified access to the home networks is disclosed. As shown in FIG. 5, a remote device may be configured to access a home based network (including home appliances) through a VPN connection 520. VPNs generally provide a powerful means of tunneling through firewalls and gaining external access to a home network, however in the context of remote home control, there are several problems to be solved. First, configuring a VPN can be complex and time-consuming. Secondly, not all IP/Web enabled devices are capable of utilizing VPN services. Lastly, a user may want to securely access their home network from a public terminal or other shared device.

The general VPN based solution disclosed for use in connection with a networked home control and automation environment is to provide a web based service which will itself establish a VPN connection to the user's home network and provide the needed network connectivity to the user's remote device. The user would of course have to configure their home network to enable VPN, as well as configure the web based service with the relevant connection information. However, an easily implemented wizard based installation application could make this task relatively simple. One such implementation of this solution could be a web service which provides a proxied connection to home control software running on a user's home network. Through such a service, a user could remotely query, configure and control their home system from a smart phone or even from a web interface on a public terminal.

Figure 7:
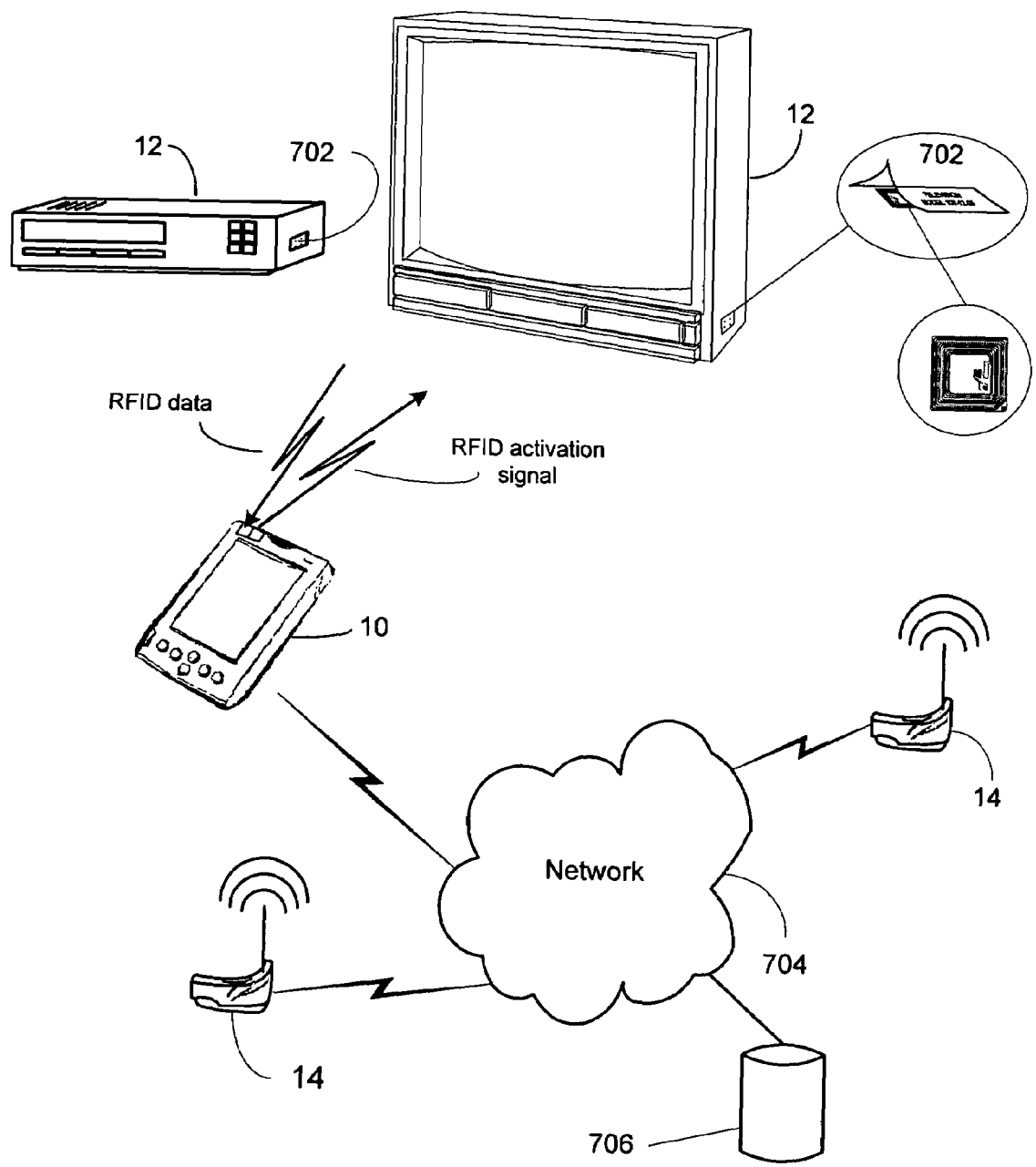
FIG. 7 illustrates an exemplary networked home control environment incorporating RFID enabled devices.

For use in configuring the remote control 10 to command functions of appliances directly, the remote control 10 may be adapted, as illustrated in FIG. 7, to read RFID tag 702 information associated with appliances 12 in a manner described in commonly assigned, co-pending U.S. patent application Ser. No. 10/665,642, filed Sep. 19, 2003, which is incorporated herein by reference in its entirety. It will also be appreciated that appliance identifiers reflected in a RFID tag read by a remote control 10 may also be disseminated throughout a network 704 whereby control centric devices 14 may use the supplied appliance identifiers to likewise configure themselves to command functions of the appliances so identified. In this regard, the control centric devices 14 may use a supplied appliance identifier to retrieve from their local memory commands for commanding feature sets of an appliance, use the supplied appliance identifier to retrieve commands for commanding feature sets of an appliance from a remote database 706 via a network 704 (it will be understood that although symbolically represented in FIG. 7 as a single entity for the sake of simplicity, network 704 may comprise any type of wired or wireless local area or wide area network or a combination thereof), etc. Still further, the remote control 10 may be responsible for using the appliance identifier to select and retrieve the commands for commanding feature sets of the appliance using any of the methods described above and then be caused to supply the commands to one or more of the control centric devices 14. Alternatively, the remote control 10 may forward the appliance identifier information obtained from the RFID tag, or relay the RFID tag signal to a separate processing system such as a personal computer, server, or other network-attached device which may in turn be caused to perform retrieval of the commands for commanding feature sets of the appliance and then supply the commands to one or more of the control centric devices 14. It will be appreciated that using RFID to identify appliances in this manner would be particularly advantageous when used in connection with the "generic" remote control previously described.

It will also be appreciated that other devices in the system beyond the remote control 10 may be given the capability to read and then use and/or disseminate throughout the network RFID appliance identifiers for the purposes described above, such as the control centric devices 14 themselves, a computer in the network, a dedicated RFID reader, etc. By way of example only, an appliance, such as a security device, may be equipped to read the RFID identifier of appliances as appliances are brought into a home whereby the new appliances can be automatically added to the system. The bringing into the home of a new appliance may not only trigger the configuration of the system to accommodate the new appliance, but may also trigger an automatic registration of the new appliance with the home owners insurance carrier, satellite or cable service provider, or other interested party. In this regard, appliance identifier information read from an RFID tag may also be used to not only retrieve commands appropriate for commanding that appliance, but may also be provided via the Internet to a Web site and then used to automatically register the warranty for that appliance with a warranty service provider, in a manner similar to that described in co-pending, commonly assigned U.S. patent application Ser. No. 10/151,635, filed May 20, 2002, which application is incorporated herein by reference in its entirety.

Still further, appliance identifier information read from an RFID tag associated with an appliance may be used to track the location of appliances within given environments and the system may use such appliance location information to automatically adapt itself to an environment that has changed. For example, network connected RFID reading enabled devices may be provided in the various rooms within a house and as an appliance is moved from room to room, the system may track the present location of that appliance and dynamically update the address of that appliance with the address translation system, alter dynamically configured macros as needed, etc.

Alternatively, an RFID reading enabled portable controlling device, for example remote control 10, may periodically interrogate the RFID tags of fixed goods or appliances in its immediate vicinity in order to keep track of its present location by matching the responses to a known mapping of equipment within a home or office. The location information so obtained may then be used for any of the purposes mentioned earlier or as described in greater detail in previously referenced co-pending application Ser. No. 10/978,971 entitled "System and Method for Controlling Device Location Determination."

It should be understood that RFID responses of interest may not be limited in this instance to only appliances intended to be controlled by the controlling device. By way of example only, a controlling device may utilize the RFID response from a refrigerator to determine that it is currently in or near the kitchen, from an item of furniture (alone or in combination with other responses) to determine it is in or near the living room, etc. Further, while described in the above example in terms of single device responses for simplicity it will be appreciated that in general, a controlling device may evoke multiple RFID responses from a given location and these may accordingly be used to compare against a database of previously established groups of RFID identities known to be present in various locations. In this manner, rather than relying on the RFID identity of a single device or good which may become unresponsive or even be moved by a user, controlling device location information may be reliably derived based on a "closest match" algorithm. In this regard it is also contemplated that a user may optionally acquire additional standalone RFID tags, register them with the system, and affix them to appliances, locations, or goods which were not originally RFID enabled in order to enhance the effectiveness of any of the methods described above.

In yet another embodiment, it is contemplated that an RFID tag may be present on the controlling device itself, for example where such a controlling device was sold as an aftermarket accessory or standalone product. In this case the inverse of the above described methods may be used: the controlling device may be responsive to offer its RFID tag information to multiple networked RFID readers positioned at various locations throughout an environment or area. The location of the controlling device may accordingly be deduced by either the networked controlling device itself, or by a separate server located elsewhere, based upon the identity of the RFID reader(s) most recently in receipt of the controlling device's tag information. The RFID reader(s) (whether configured as standalone RFID readers or incorporated into a controlling or other system device) may be configured with a user selectable signal strength setting such that the operative proximity in which an RFID reader will register the presence of the RFID tag on the controlling device may be adjusted as needed for a particular environment. It will thus be appreciated that location determining methods such as described herein, may be used to generally track movement of controllable appliances as well as controlling devices with any established environments.

While the present invention is described in relation to a networked control environment, it will be appreciated that various aspects of the above described inventive concepts may be implemented within non-networked control environments without departing from the spirit and scope of the present invention. For instance, saving and recalling of device states may be accomplished through two-way communication between legacy appliances and the remote control, with all associated command saving, command translations, and command sending being performed by the remote. In this way is can be seen that programming on the remote control may effect many of the aspects and features of the present invention without use or reliance on a networked control environment. Many additional forms and implementations of the home control system and associated methods of the present invention could be contemplated for a variety of purposes without departing from the scope and spirit of the current invention.

The system and process of the present invention has been described above in terms of functional modules in block diagram format. It is understood that unless otherwise stated to the contrary herein, one or more functions may be integrated in a single physical device or a software module in a software product, or one or more functions may be implemented in separate physical devices or software modules, without departing from the scope and spirit of the present invention.

It is appreciated that detailed discussion of the actual implementation of each module is not necessary for an enabling understanding of the invention. The actual implementation is well within the routine skill of a programmer and system engineer, given the disclosure herein of the system attributes, functionality, and inter-relationship of the various functional modules in the system. A person skilled in the art, applying ordinary skill can practice the present invention without undue experimentation.

While the invention has been described with respect to the described embodiments in accordance therewith, it will be apparent to those skilled in the art that various modifications and improvements may be made without departing from the scope and spirit of the invention. Accordingly, it is to be understood that the invention is not to be limited by the specific illustrated embodiments.

All patents, patent applications, and other references cited within this document are hereby incorporated by reference in their entirety.

What is claimed is:

1. A method for providing location data for a portable device within an environment to a controlling device used to command operations of a one or more home appliances, the method comprising:

providing a database accessible to the controlling device, the database containing a plurality of location data each associated with at least one of a plurality of location signal receiving devices within the environment;

receiving a location signal from a location signal generating device associated with the portable device by a one or more of the plurality of location signal receiving devices within the environment;

using an identity of the one or more location signal receiving devices within the environment that received the location signal to select an associated one of the plurality of location data within the database;

providing the selected location data to the controlling device; and causing the controlling device to use the selected location data to place the controlling device into a state for commanding operations of the one or more home appliances.

2. The method as recited in claim 1, wherein the location signal generating device comprises an RFID tag and the location signal receiving devices comprise RFID tag reader devices.

3. The method recited in claim 2, wherein the data is read from the RFID tag only when the portable device comes within an operative proximity to a particular RFID reader device within the environment.

4. The method recited in claim 3, wherein the operative proximity is a user adjustable setting of the RFID reader device.

5. The method as recited in claim 1, wherein the controlling device comprises the portable device.

6. The method as recited in claim 2, wherein the controlling device comprises the portable device.

7. The method as recited in claim 1, comprising causing the controlling device to use the selected location data to place the one or more home appliances into a desired operational state.

8. The method as recited in claim 2, comprising causing the controlling device to use the selected location data to place the one or more home appliances into a desired operational state.

9. A method for providing location data for a portable device within an environment to a controlling device used to command operations of a one or more home appliances, the method comprising:

providing a database accessible to the controlling device, the database containing a plurality of location data each associated with at least one of a plurality of location signal receiving devices within the environment;

receiving a location signal from a location signal generating device associated with the portable device by a one or more of the plurality of location signal receiving devices within the environment;

using an identity of the one or more location signal receiving devices within the environment that received the location signal to select an associated one of the plurality of location data within the database;

providing the selected location data to the controlling device; and causing the controlling device to use the selected location data to place the one or more home appliances into a desired operational state.

10. The method as recited in claim 9, wherein the location signal generating device comprises an RFID tag and the location signal receiving devices comprise RFID tag reader devices.

11. The method recited in claim 10, wherein the data is read from the RFID tag only when the portable device comes within an operative proximity to a particular RFID reader device within the environment.

12. The method recited in claim 11, wherein the operative proximity is a user adjustable setting of the RFID reader device.

13. The method as recited in claim 9, wherein the controlling device comprises the portable device.

14. The method as recited in claim 10, wherein the controlling device comprises the portable device.

15. The method as recited in claim 9, wherein the controlling device-uses the selected location data to place the one or more home appliances into a desired volume state.

16. The method as recited in claim 9, wherein the controlling device uses the selected location data to place the one or more home appliances into a desired lighting state.

17. The method as recited in claim 9, wherein the controlling device uses the selected location data to place the one or more home appliances into a desired audio playback state.

18. The method as recited in claim 9, wherein the controlling device uses the selected location data to place the one or more home appliances into a desired video playback state.

19. The method as recited in claim 9, wherein the controlling device communicates directly with the one or more home appliances to place the one or more home appliances into the desired operational state.

20. The method as recited in claim 9, wherein the controlling device communicates with an intermediate device in communication with the one or more home appliances to place the one or more home appliances into the desired operational state.

* * * * *